United States Patent
Hashemzadeh et al.

(10) Patent No.: US 10,662,346 B2
(45) Date of Patent: May 26, 2020

(54) POLYMERS FOR DIRT-REPELLENT COATINGS

(71) Applicant: WACKER CHEMIE AG, München (DE)

(72) Inventors: Abdulmajid Hashemzadeh, Burghausen (DE); Armin Hoffmann, Neuötting (DE)

(73) Assignee: Wacker Chemie AG, Munich (DE)

( * ) Notice: Subject to any disclaimer, the term of this patent is extended or adjusted under 35 U.S.C. 154(b) by 183 days.

(21) Appl. No.: 15/570,789

(22) PCT Filed: Apr. 27, 2016

(86) PCT No.: PCT/EP2016/059349
§ 371 (c)(1),
(2) Date: Oct. 31, 2017

(87) PCT Pub. No.: WO2016/184650
PCT Pub. Date: Nov. 24, 2016

(65) Prior Publication Data
US 2018/0148594 A1 May 31, 2018

(30) Foreign Application Priority Data
May 21, 2015 (DE) .................. 10 2015 209 381

(51) Int. Cl.
C09D 131/02 (2006.01)
C09D 5/02 (2006.01)
C09D 143/04 (2006.01)
C09D 133/12 (2006.01)
C09D 133/08 (2006.01)
C08F 2/22 (2006.01)
C08F 220/18 (2006.01)

(52) U.S. Cl.
CPC .............. C09D 131/02 (2013.01); C08F 2/22 (2013.01); C09D 5/02 (2013.01); C09D 133/08 (2013.01); C09D 133/12 (2013.01); C09D 143/04 (2013.01); C08F 220/1808 (2020.02)

(58) Field of Classification Search
CPC ....... C09D 131/02; C09D 5/02; C09D 143/04
USPC ........................................ 524/700
See application file for complete search history.

(56) References Cited

U.S. PATENT DOCUMENTS

| 6,254,985 | B1 | 7/2001 | Gerst et al. |
| 6,528,590 | B1 | 3/2003 | Beyer et al. |
| 7,122,599 | B2 | 10/2006 | Haubennestel et al. |
| 7,931,972 | B2* | 4/2011 | Hsu ........ C04B 41/483 428/451 |
| 8,901,237 | B2 | 12/2014 | Chowdhry et al. |
| 2006/0024263 | A1* | 2/2006 | Van Es ........ C08F 2/50 424/70.16 |
| 2008/0139690 | A1 | 6/2008 | Becker et al. |
| 2013/0029142 | A1 | 1/2013 | Hoffmann et al. |
| 2016/0280814 | A1 | 9/2016 | Nakao |

FOREIGN PATENT DOCUMENTS

| DE | 19707219 A1 | 8/1998 |
| DE | 19818394 A1 | 10/1999 |
| DE | 19858851 C2 | 9/2001 |
| DE | 102004016647 A1 | 10/2005 |
| EP | 0327376 A2 | 8/1989 |
| EP | 0614955 A1 | 9/1994 |
| EP | 1398333 A1 | 3/2004 |
| EP | 1732997 A1 | 12/2006 |
| EP | 1926787 A1 | 6/2008 |
| EP | 2010467 A2 | 1/2009 |
| EP | 2832754 A1 | 2/2015 |
| JP | 2001114898 A | 4/2001 |
| WO | 9810026 A1 | 3/1998 |
| WO | 9838257 A1 | 9/1998 |
| WO | 2005095532 A1 | 10/2005 |
| WO | 2007031480 A1 | 3/2007 |
| WO | 2007124399 A2 | 11/2007 |
| WO | 2011128232 A1 | 10/2011 |
| WO | 2014190516 A1 | 12/2014 |
| WO | 2015068751 A1 | 5/2015 |

OTHER PUBLICATIONS

Fox, T.G., "Influence of Diluent and of Copolymer Composition on the Glass Temperature of a Polymer System", Bull. Am. Physics Soc., 1956, p. 123.
Lee et al., "The Glass Transition Temperatures of Polymers", Polymer Handbook, Second Edition, John Wiley & Sons, (1975) 58 Pages.

* cited by examiner

Primary Examiner — Kelechi C Egwim
(74) Attorney, Agent, or Firm — RatnerPrestia

(57) ABSTRACT

The present invention relates to aqueous dispersions or polymer powders which are redispersible in water, based on a) 2-ethylhexylacrylate, b) n-butylacrylate, c) one or more ethylenically unsaturated monomers, the homopolymer of which has a glass transition temperature Tg of $\geq 50°$ C., d) optionally one or more ethylenically unsaturated monomers containing acid groups, e) optionally one or more ethylenically unsaturated monomers containing silane groups and f) optionally one or more additional ethylenically unsaturated monomers which are different to the aforementioned monomers, characterised in that the polymers are based on 2-ethylhexylacrylate from 60 to 99 wt % and on n-butylacrylate from 1 to 40 wt %, each relative to the total weight of ethylhexylacrylate a) and n-butylacrylate b).

12 Claims, No Drawings

POLYMERS FOR DIRT-REPELLENT COATINGS

CROSS-REFERENCE TO RELATED APPLICATIONS

This application is the U.S. National stags filing of International Application No. PCT/EP2016/059349, filed 27 Apr. 2016, and claims priority of German application number 10 1015 209 381.6, filed 21 May 2015, the entireties of which applications are incorporated herein by reference.

FIELD OF THE INVENTION

The invention relates to polymers based on acrylic esters in the form of aqueous dispersions or of water-redispersible powders, their methods of making, and also aqueous coating media comprising the aforementioned polymers and their use in the production of dirt-repellent coatings.

BACKGROUND OF THE INVENTION

Dirt-repellent coatings are designed to confer protection from soiling on substrates coated therewith. The soiling proclivity of porous or absorbent substrates, such as wood, concrete, natural stone or artificial stone, is particularly pronounced, especially on contact with liquids, particularly with colored liquids, such as coffee, tea or oils. Soiling here takes the form of colored stains being formed on the substrate due to extraction of colored substances out of the substrate or due to importation of colored substances into the substrate. Different dirt-repellent coatings have been proposed in an effort to preempt such problems. EP-A 1 926 787 for instance teaches coating media based on polymer latex binders comprising phosphoric esters as anionic emulsifiers. WO-A 98/10026 similarly teaches therefor anionically stabilized polymers of styrene, acrylic esters and also ethylenically unsaturated carboxylic acids. WO-A 2011/128232 recommends improving the soiling resistance of cementitious coatings by sprinkling dry building materials comprising redispersible polymeric powders onto not yet fully set cementitious substrates.

Alternatively, it has also been proposed that the ability to wash off stains be improved by modifying the coatings with additives. DE-A 197 07 219 therefor teaches aqueous coating media comprising not only some film-forming organic polymers but also low molecular weight organosilicon compounds as essential component.

Dirt-repellent and washable paints have likewise been intensively described. EP-A1 0 614 955 for instance teaches styrene-acrylate copolymers useful as additives for paints. EP-A 1 732 997 recommends improving the pigment-binding capacity and the wet abrasion resistance of pigmentary coatings by the addition of polymers based on specified amounts of so-called hard and soft monomers and also ethylhexyl acrylate and acid-functional monomers.

Yet it continues to be a problem to provide coatings which protect the substrates from soiling in the event of contract with various liquids, for example contact with hydrophobic and/or hydrophilic liquids, such as coffee, tea, ketchup, fats or oils, i.e., particularly substances from the food sector. This problem setting is particularly acute with porous or absorbent substrates or on contact with warm or even hot liquids.

SUMMARY OF THE INVENTION

Against this background, the invention further has for its object to provide measures for ameliorating the aforementioned problems regarding the soiling resistance of coated substrates.

We have found that, surprisingly, this object is achieved by aqueous coating media comprising polymers having the monomer composition of the present invention.

DETAILED DESCRIPTION OF THE INVENTION

The invention provides an aqueous dispersion or water-redispersible powder of a polymer based on a) 2-ethylhexyl acrylate,
b) n-butyl acrylate,
c) one or more ethylenically unsaturated monomers whose homopolymer has a glass transition temperature Tg of $\geq 50°$ C.,
d) optionally one or more ethylenically unsaturated monomers bearing acid groups,
e) optionally one or more ethylenically unsaturated monomers bearing silane groups, and
f) optionally one or sore further ethylenically unsaturated monomers other than the aforementioned monomers,
characterized in that the polymer is
60 to 99 wt % based on 2-ethylhexyl acrylate a) and
1 to 40 wt % based on n-butyl acrylate b),
all based on the combined weight of ethylhexyl acrylate a) and n-butyl acrylate b).

The extent to which the polymer is based on 2-ethylhexyl acrylate a) is preferably from 70 to 96 wt %, more preferably from 80 to 93 wt % and most preferably from 85 to 90 wt %,
all based on the combined weight of the monomers ethylhexyl acrylate a) and n-butyl acrylate b).

The extent to which the polymer is based on 2-ethylhexyl acrylate a) is preferably from 20 to 60 wt %, more preferably from 30 to 50 wt % and most preferably from 35 to 45 wt %,
all based on the total weight of the polymer.

The extent to which the polymer is based on n-butyl acrylate b) is preferably from 4 to 30 wt %, more preferably from 7 to 20 wt % and most preferably from 10 to 15 wt %,
all based on the combined weight of the monomers ethylhexyl acrylate a) and n-butyl acrylate b).

The extent to which the polymer is based on n-butyl acrylate b) is preferably from 1 to 20 wt %, more preferably from 3 to 15 wt % and
most preferably from 4 to 10 wt %,
all based on the total weight of the polymer.

The weight ratio of 2-ethylhexyl acrylate a) to n-butyl acrylate b) is preferably from 3:1 to 15:1, more preferably from 5:1 to 10:1 and most preferably from 6:1 to 7:1.

Examples of monomers c) include vinylaromatics and $C_1$ to $C_4$ alkyl methacrylate whose homopolymers have a glass transition temperature Tg of $\geq 50°$ C., preferably $\geq 80°$ C.

Preferred vinylaromatics are styrene or alpha-methylstyrene and also their ring-substituted derivatives. Preferred monomers c) are styrene, methyl methacrylate, tert-butyl methacrylate, tert-butyl acrylate, lauryl acrylate, stearyl acrylate. Styrene and methyl methacrylate are particularly preferable.

The extent to which the polymer is based on monomers c) is preferably from 30 to 70 wt %, more preferably from 40 to 60 wt % and most preferably from 45 to 55 wt %,
all based on the total weight of the polymer.

The monomers and/or the weight fractions of the comonomers are selected so as to give the aforementioned glass transition temperatures Tg. The glass transition temperature Tg of the polymer is determinable in a known manner by DSC (differential scanning calorimetry, DIN EN ISO 11357-1/2), for example using DSC1 differential scanning calorimeter from Mettler-Toledo in an open crucible at a heating rate of 10 K/min. The glass transition temperature is taken to be the temperature at the midpoint of the step in the heat flow diagram of the second heating curve (midpoint=half the step height). Tg is also arithmetically approximatable in advance using the Fox equation (Fox T. G., Bull, Am. Physics Soc. 1, 3, page 123 (1956): $1/Tg=x1/Tg1+x2/Tg2+ \ldots +xn/Tgn$, where xn is the mass fraction (wt %/100) of monomer n and Tgn is the glass transition temperature, in kelvins, of the homopolymer of monomer n). Tg values of homopolymers are reported in the Polymer Handbook 2nd Edition, J. Wiley & Sons, New York (1975). The proportion of polymers which is attributable to individual monomers, especially the proportion 2-ethylhexyl acrylate and n-butyl acrylate, is determinable using routine analytical methods, for example NMR spectroscopy.

Monomers d) may be for example ethylenically unsaturated monomers bearing sulfonic acid groups or preferably ethylenically unsaturated monomers bearing carboxylic acid groups. Preference is given to ethylenically unsaturated $C_3$ to $C_8$ carboxylic acids or anhydrides, such as acrylic acid, methacrylic acid, crotonic acid, fumaric acid, maleic acid, maleic anhydride, itaconic acid, itaconic anhydride and acrylamidoglycolic acid. Preference is also given to ethylenically unsaturated alkyl- or arylsulfonic acids, such as vinylsulfonic acid, methallylsulfonic acid, vinylbenzenesulfonic acid, acrylamidoethansulfonic acid, acrylamido-2-methylpropanesulfonic acid (AMPS), 2-sulfoethyl acrylate, 2-sulfoethyl methacrylate, 3-sulfopropyl acrylate, 3-sulfopropyl methacrylate, especially in combination with ethylenically unsaturated carboxylic acids. Monomers d) may also be used in the form of salts, especially alkaline (earth) metal or ammonium salts. Particular preference is given to acrylic acid, methacrylic acid, itaconic acid, maleic acid and acrylamido-2-methpropanesulfonic acid. Acrylic acid and especially methacrylic acid are most preferable.

Preferred monomers d), especially monomers d) bearing carboxylic acid groups, have pKa values of preferably 3 to 6 and more preferably 4.1 to 5.

The extent to which the polymers are based on monomers d) is preferably from 0.1 to 10 wt %, more preferably from 0.5 to 6 wt %, yet more preferably from 1 to 5 wt % and most preferably from 2.5 to 4.5 wt %,
all based on the total weight of the polymers.

Examples of ethylenically unsaturated monomers e) bearing silane groups are compounds of the general formula $R^1SiR^2_{0-2}(OR^3)_{1-3}$, where $R^2$ represents $C_1$ to $C_3$ alkyl moiety, a $C_1$ to $C_3$ alkoxy moiety or halogen, for example chlorine or bromine, $R^1$ represents $CH_2=CR^4-(CH_2)_{0-1}$ or $CH_2=CR^4CO_2(CH_2)_{1-3}$ where carbon moiety $R^4$ has from 1 to 10 carbon atoms, $R^3$ represents a branched or unbranched, optionally substituted alkyl moiety of 1 to 12 carbon atoms, preferably of 1 to 3 carbon atoms. The silicon atom Si is tetravalent, as will be known.

Preference is given to γ-acryloyl- and γ-methacryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes and vinyltri(alkoxy)silanes, usable alkoxy groups including for example methoxy, ethoxy, isopropoxy, methoxyethylene, ethoxyethylene, methoxypropylene glycol ether and ethoxypropylene glycol ether moieties. Particularly preferred monomers e) are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltris(2-methoxyethoxy)silane, allylvinyltrimethoxysilane, allyltrimethoxysilane, vinyldimethylmethoxysilane, vinyldimethylethoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane and vinyldimethoxylauryloxysilane.

Unsaturated alkoxysilanes are most preferably vinyltrimethoxysilane, vinylmethydimethoxysilane, vinyltriethoxysilane, vinyltriisopropoxysilane, vinylmethyldiethoxysilane, vinyltris(1-methoxy)isopropoxysilane, methacryloyloxypropyltris(2-methoxyethoxy)silane, 3-methacryloyl oxypropyltrimethoxysilane, 3-methacryloyloxypropylmethyldimethoxysilane and methacryloyloxymethyltrimethoxysilane.

Vinylsilanes, i.e., silanes comprising vinyl groups, are preferable.

The extent to which the polymers are based on monomer e) is preferably from 0 to 5 wt %, mere preferably from 0.1 to 3 wt % and most preferably from 0.5 to 1.3 wt %,
all based on the total weight of the polymers.

The further ethylenically unsaturated monomers f), other than the aforementioned polymers, may be, for example, one or more monomers f) selected from the group comprising n-hexyl acrylate or n-hexyl methacrylate.

The extent to which the polymers are baaed on monomers fit range for example from 0 to 30 wt %, preferably from 1 to 20 wt % and more preferably from 1 to 10 wt %, all based on the total weight of the polymers. However, monomers f) may also be eschewed.

The further ethylenically unsaturated monomers f), other than the aforementioned monomers, may also be, for example, one or more monomers f2) selected from the group comprising ethylenically unsaturated carbonitriles, preferably acrylonitrile; monomers having hydroxyl or CO groups, for example methacrylic or acrylic hydroxyalkyl esters such as hydroxyethyl acrylate, hydroxyethyl methacrylate, hydroxypropyl acrylate, hydroxypropyl methacrylate, hydroxybutyl acrylate or hydroxybutyl methacrylate, and also compounds such as diacetoneacrylamide or acetylacetoxyethyl acrylate or methacrylate; N-methylol(meth)acrylamide or N-(alkoxymethyl) (meth)acrylamides, such as N-(isobutoxymethyl)-acrylamide (IBMA), N-(isobutoxymethyl)methacrylamide (IBMMA), N-(n-butoxymethyl)acrylamide (NBMA) or N-(n-butoxymethyl)methacrylamide (NBMMA); further examples are precrosslinking comonomers, such as polyethylenically unsaturated comonomers, for example divinyl adipate, diallyl maleate, allyl methacrylate, triallyl isocyanurate or triallyl cyanurate.

The extent to which the polymers are based on monomers f2) is preferably from 0.1 to 10 wt % and more preferably from 0.5 to 5 wt %, all based on the total weight of the polymers. What is most preferable is not to use any monomers f2), especially no hydroxyalkyl (meth)acrylates.

The polymers may also be based on fluorine-substituted ethylenically unsaturated monomers; preferably, however, the polymers are not based on fluorine-substituted ethylenically unsaturated monomers.

The polymers have glass transition temperatures Tg of preferably 10 to 40° C. and more preferably of 15 to 30° C.

The present invention further provides a method of preparing a polymer in the form of an aqueous dispersion or of a water-redispersible powder by free-radically initiated emulsion polymerization in an aqueous medium of
- a) 2-ethylhexyl acrylate,
- b) n-butyl acrylate,
- c) one or more ethylenically unsaturated monomers whose homopolymer has a glass transition temperature Tg of ≥50° C.,
- d) optionally one or more ethylenically unsaturated monomers bearing acid groups,
- e) optionally one or more ethylenically unsaturated monomers bearing silane groups, and
- f) optionally one or more further ethylenically unsaturated monomers other than the aforementioned monomers, and
optionally subsequent drying, characterized in that
60 to 99 wt % of 2-ethylhexyl acrylate a) and
1 to 40 wt % of n-butyl acrylate b) are used,
each based on the combined weight of the monomers ethylhexyl acrylate a) and n-butyl acrylate b).

The polymerization temperature is preferably between 40° C. and 100° C. acid, more preferably between 60° C. and 90° C. The copolymerization is generally carried out at pressures between 0.5 bar and 7 bar.

The polymerization pH is preferably in the range from 2 to 7 and more preferably in the range from 3 to 5 and may be established, for example, using the customary organic or inorganic acids, bases or buffers, such as phosphoric acid, carbonic acid, carboxylic acids or ammonia or salts thereof. After polymerization, the polymer dispersion is preferably neutralized. The polymer dispersion pH is preferably in the range from 6 to 10, more preferably in the range from 6 to 8 and most preferably equal to 7. This is advantageous for achieving the object of the present invention.

The polymerization is initiatable using, for example, the water-soluble and/or monomer-soluble initiators, or redox initiator combinations, customary for emulsion polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene mono-hydroperoxide, azobisisobutyronitrile. Examples of monomer-soluble initiators are dicetyl peroxydicarbonate, dicylohexyl peroxydicarbonate, dibenzoyl peroxide. The initiators referred to are generally used in amount of 0.1 to 5 wt %, preferably 0.1 to 1 wt % and most preferably 0.1 to 0.5 wt %, all based on the total weight of the monomers.

Redox initiators used are preferably combinations of the recited initiators and reducing agents. Suitable reducing agents include, for example, the sulfites and bisulfites of the alkali metals and of ammonium, for example sodium, sulfite, the derivatives of sulfoxylic acid such as zinc or alkali metal formaldehydesulfoxylates, for example sodium hydroxymethanesulfinate, and ascorbic acid. The amount of reducing agent is generally in the range from 0.015 to 3 wt %, both based on the total weight of the monomers.

Chain transfer agents are usable in the polymerization to control the molecular weight. Chain transfer agents, if used at all, are customarily used in amounts between 0.1 to 1.0 wt %, preferably 0.1 to 0.6 wt % and most preferably 0.3 to 0.5 wt %, based on the monomers to be polymerized. Chain transfer agents are addable separately or else premixed with reaction components. Examples of chain transfer agents are n-dodecyl mercaptan, tert-dodecylmercaptan, mercaptopropionic acid, methyl mercaptopropionate, isopropanol and acetaldehyde.

The polymerization is generally carried out in the presence of emulsifiers. Emulsifiers are typically used in amounts from 0.1 to 5 wt %, preferably from 0.2 to 4 wt % and most preferably from 0.5 to 3 wt %, based on the total weight of all the monomers used. Suitable emulsifiers are generally cationic emulsifiers, nonionic emulsifiers and especially anionic emulsifiers, for example anionic surfactants, such as alkyl sulfates having a chain length of 8 to 18 carbon atoms, alkyl or alkylaryl ether sulfates having 8 to 18 carbon atoms in the hydrophobic moiety and up to 40 ethylene or propylene oxide units, alkyl or alkylaryl sulfonates having 8 to 18 carbon atoms, esters and monoesters of sulfosuccinic acid with monohydric alcohols or alkylphenols, or nonionic surfactants such as alkyl polyglycols ethers or alkylaryl polyglycol ethers having 8 to 40 ethylene oxide units. Particular preference is given to alkyl sulfates, especially lauryl sulfates. Such a use of emulsifiers is advantageous for achieving the object of the present invention.

Nonionic emulsifiers are preferably used in an amount at ≤3 wt % and more preferably used in an amount ≤1 wt %, based on the total weight of all the monomers used. What is most preferred is not to use any nonionic emulsifiers at all. The proportion of anionic emulsifiers preferably from 50 to 100 wt % and more preferably from 70 to 100 wt %, all based on the total weight of all the emulsifiers used for the polymerization. What is most preferred is to use solely anionic emulsifiers.

It is also possible to carry out the polymerization in the presence of 0 to 10 wt %, especially from 0.1 to 7 wt % of protective colloids, based on the total weight of all the monomers used, polyvinyl alcohols being examples of protective colloids. The polymerization is preferably carried out an the absence of protective colloids.

Polymerization may be followed by a postpolymerization carried out according to known methods for the purpose of residual monomer removal, generally by a postpolymerization initiated using redox catalyst. Residual monomers that are volatile are also removable by distillation, preferably under reduced pressure, and optionally with inert entraining gases, such as air, nitrogen or water vapor, being passed therethrough or thereover.

The aqueous dispersions thus obtainable have a solid content of preferably 20 to 70 wt % and more preferably of 30 to 60 wt %.

The aqueous dispersions comprise with preference no protective colloids.

The polymers in the form of aqueous dispersions have central value particle diameters of preferably 40 and 200 nm and more preferably 60 and 120 nm (as determined to ISO 13320 (PIDS) using a Beckmann Coulter LS).

To produce polymer powders that are redispersible in water, the aqueous dispersions may be dried, for example by fluidized bed drying, freeze drying or spray drying, optionally after addition of protective colloids as drying aids. Preferably, the dispersions are spray dried. This spray drying may be carried cut in customary spray dryers, in which case atomization may be effected using nozzles for one, two or more fluids or a rotating disk, for example. The choice of exit temperature, which is generally in the range from 45° C.

to 120° C., preferably from 60° C. to 90° C., is made according to the equipment, the resin Tg and the desired dryness.

The drying aid is generally used in a total amount of 3 to 30 wt %, based on the polymeric constituents of the dispersion. The total amount of protective colloid prior to the drying step is preferably in the range from 3 to 30 wt %, more preferably 5 to 20 wt %, based on the polymer fraction. Polyvinyl alcohols are examples of suitable drying aids.

Nozzle atomization will frequently be found to benefit from the presence, at up to 3 wt %, of antifoam, based on the base polymer. The powder obtained may be endowed with an antiblocking or anticaking agent, preferably at up to 30 wt %, based on the total weight of polymeric constituents, in an effort to enhance storability by improving blocking resistance. Examples of antiblocking agents are calcium carbonate, magnesium carbonate, talc, gypsum, silica, especially hydrophobic silica, kaolins, silicates having particle sizes, preferably in the range from 10 nm to 10 µm.

The viscosity of the nozzlefeed is adjusted via the solids content, preferably so as to obtain a value of <500 mPas (Brookfield viscosity at 20 revolutions and 23° C.), more preferably <250 mPas. The solids content of the dispersion to be nozzle atomized is preferably >35%, more preferably >40%.

To improve performance characteristics, further admixtures may be made, for example in the course of nozzle atomization. Further constituents included in preferred embodiments of redispersible polymeric powder compositions are pigments, fillers, foam stabilizers, hydrophobicizers.

The central value particle diameter of the polymers in the form of their powders is preferably between 20 and 200 micrometers, more preferably between 40 and 120 micrometers and most preferably between 60 and 100 micrometers (Coulter determination).

The invention further provides an aqueous coating medium comprising one or more polymers of the presort invention, water and optionally one or more additives.

The invention further provides the method of using the polymers of the present invention in the production of dirt-repellent coatings.

The aqueous coating media comprise with preference from 10 to 100 wt %, with particular preference from 50 to 100 wt % and with greatest preference from 80 to 100 wt % of polymers according to the present invention, based on the dry weight of the aqueous coating media. The polymers of the present invention are employable in the form of aqueous dispersions or water-redispersible powders.

The aqueous costing media comprise with preference from 30 to 90 wt % and with particular preference from 40 to 85 wt % of water, based on the total weight of the aqueous coating media.

Examples of additives are hydrophobicizers, such as waxes or silicones, thickeners, delusterants, defoamers, rheology modifiers, antifreezes, film-forming auxiliaries, wetters, additional surfactants, biocides, plasticizers or polymeric binders other than the polymers of the present invention. The aqueous coating media comprise with preference from 0 to 20 wt % and with particular preference from 0.1 to 10 wt % of additives, based on the dry weight of the aqueous coating media. In one preferred embodiment, the aqueous coating media comprise ≤2 wt % and more preferably ≤1 wt % of plasticizer, both based on the dry weight of the aqueous coating media. What is most preferable is for the aqueous coating media not to comprise any plasticizers.

The aqueous coating media may further comprise pigments, dyes or fillers. The aqueous coating media preferably comprise clearcoats. Clearcoats preferably comprise no pigments or dyes and more preferably no fillers.

The aqueous coating media preferably comprise no protective colloids.

The method of producing the aqueous coating media is not tied to one special procedure, and may be carried out in a conventional manner, for example by mixing the constituents of the aqueous coating media in customary mixers.

The method of applying the aqueous coating media to substrates is not tied to one special process, and may take the form for example of spread coating, for example via a long-hair brush, rolls or mops, flat coating, printing, spraying or squirting.

Examples of substrates include wood or wood-base materials, for example paneling or furniture, mineral substrates, such as concrete, screed, render or plaster, ceramic, natural stone or artificial stone. These substrates may also be porous or absorbent.

The aqueous coating media may be applied to pretreated substrates or untreated substrates. Pretreated substrates include, for example, substrates already coated with one or more coating media other than the aqueous coating media of the present invention, for example with a paint, a foundation or a primer. However, the aqueous coating media of the present invention may also be applied to the substrates directly, i.e., as the first coating medium. Coatings based on aqueous coating media of the present invention preferably do not nave any farmer coating medium applied on top. The coating of the present invention is thus preferably the topcoating.

Layer thicknesses of coatings based on the aqueous coating media according to the present invention are preferably in the range from 0.01 to 50 µm.

The polymer dispersions or powders of the present invention provide coatings having particularly advantageous dirt-repellent or soiling-resistant properties, even in the event of the coatings becoming contaminated with liquids of wholly different polarities, for example coffee, tea, ketchup, fats or oils from the food sector or else mineral oil or aqueous inks. Soiling resistance is even obtainable for the eventuality of contact with warm or hot liquids. Any stains caused by liquids are wholly or at least partly removable by washing off. The coatings of the present invention also display an advantageous level of UV resistance. The coatings of the present invention yet further also have a high level of abrasion resistance. It is a surprise that these effects were obtained with the constitution the present invention mandates for the polymers of the present invention.

EXAMPLES

The examples which follow are intended to further elucidate the invention without restricting it in any way.

Description of methods to characterize the polymer dispersions:

Solids Content:

Determination as per DIN EN ISO 3251 in drying cabinet at 150° C. for 20 min.

Brookfield Viscosity

Determination with a Brookfield viscometer, after temperature regulation to 23° C., by use of spindle 1, at 20 revolutions per minute.

Weight Average Particles Size:

Determined using a Beckmann Coulter LS in accordance with ISO 13320 (PIDS).

Example 1 (Ex. 1)

A 3 liter capacity reactor was initially charged with 1.104 kg of deionized water, 1.23 g of potassium peroxodisulfate, 12.3 g or sodium laurylsulfate and 0.7 g of ammonia (12.5% strength in water) in a nitrogen atmosphere, followed by heating to 40° C. under agitation. Once 40° C. was reached, the following monomer mixture, monomer mixture 1, was introduced into the reactor:

Monomer Mixture 1:

| | |
|---|---|
| n-butyl acrylate | 9.8 g |
| ethylhexyl acrylate | 65.1 g |
| methacrylic acid | 4.9 g |
| methyl methacrylate | 42.3 g |
| styrene | 40.7 g. |

The temperature was subsequently raised to 80° C. 30 minutes after 80° C. had been reached, the following monomer mixture, monomer mixture 2, and the following potassium peroxodisulfate solution were metered into the reactor over 150 minutes and 180 minutes respectively:

Monomer Mixture 2:

| | |
|---|---|
| n-butyl acrylate | 39.5 g |
| ethylhexyl acrylate | 263.1 g |
| methacrylic acid | 19.7 g |
| methyl methacrylate | 171.0 g |
| styrene | 164.5 g. |
| potassium peroxodisulfate solution: | |
| potassium peroxodisulfate | 1.64 g |
| water | 53.30 g. |

On completion of the metered addition, the mixture was stirred at 85° C. for two hours. The pH was maintained in the range from 3 to 4.5 during the polymerization. This was followed by cooling down to room temperature and pH adjustment to 7 with aqueous ammonia solution.

The polymer dispersion thus obtained had a solids content of 41.5%, a Brookfield viscosity of 219 mPa·s and also a weight average particle size of 69 nm.

Example 2 (Ex. 2)

Example 1 was repeated except that vinyltriethoxysilane was additionally used at 1.0 wt %, bused on the total weight of all the monomers used, the vinyltriethoxysilane being apportioned half and half between monomer mixture 1 and monomer mixture 2.

The polymer dispersion thus obtained had a solids content of 41.3%, a Brookfield viscosity of 234 mPa·s and also a weight average particle size of 71 nm.

Comparative Example 3 (Ex. 3)

Example 1 was repeated except that the following monomer mixtures were used as monomer mixtures 1 and 2:

Monomer Mixture 1:

| | |
|---|---|
| n-butyl acrylate | 37.5 g |
| ethylhexyl acrylate | 37.5 g |
| methacrylic acid | 4.9 g |
| methyl methacrylate | 42.3 g |
| styrene | 40.7 g. |

Monomer Mixture 2:

| | |
|---|---|
| n-butyl acrylate | 151.3 g |
| ethylhexyl acrylate | 151.3 g |
| methacrylic acid | 19.7 g |
| methyl methacrylate | 171.0 g |
| styrene | 164.5 g. |

The polymer dispersion thus obtained had a solids content of 41.5%, a Brookfield viscosity of 225 mPa·s and also a weight average particle size of 75 nm.

Preparation of Sample Specimens:

The particular polymer dispersion was diluted with water to a solids content of 20% and then applied with a long-hair brush to a test specimen. Subsequent drying by two weeks of aging under standard conditions to DIN50014 gave the sample specimen.

Testing of Soiling Proclivity:

The sample specimens each had applies to them three stains of ketchup, mustard, sunflower oil, balsamico, hot coffee and not black tea (90 to 95° C.). After 24 hours of aging under standard conditions to DIN0014, the surface thus treated of the particular sample specimen was rinsed off with water and redried. The soiling of the surface of the dried sample specimen was rated visually according to the following system of (German) school grades:

1=absolutely no soiling residues discernible;

2=minimal traces of soiling residues discernible with one or two substances;

3=minimal traces of soiling residues discernible with three or four substances;

4=soiling residues readily discernible for all six substances on the surface;

5=all six applied substances very substantially penetrated into the test specimen; soiling residues of all six substances very distinctly apparent on the surface of the test specimen.

The test results are summarized in Table 1.

TABLE 1

Soiling proclivity of sample specimens:

| Sample specimen treated with: | Soiling medium | | | | | |
|---|---|---|---|---|---|---|
| | ketchup | hot coffee | hot black tea | oil | balsamico | mustard |
| — | 4 | 4 | 4 | 5 | 5 | 5 |
| CEx. 3 dispersion | 2 | 3 | 2 | 2 | 3 | 3 |
| Ex. 1 dispersion | 1 | 2 | 1 | 2 | 2 | 3 |
| Ex. 2 dispersion | 1 | 1 | 1 | 2 | 2 | 2 |

Table 1 reveals that by virtue of the constitution of the polymers according to the present invention, the soiling resistance of sample specimens to hydrophilic substances, such as ketchup, balsamico, coffee and tea, has been improved and additionally as outstanding soiling resistance to lipophilic dirt has been attained. Altogether, the sample specimens coated according to the present invention exhibit an outstanding and balanced soiling resistance not only to hydrophilic but also to lipophilic contaminants.

Testing of Abrasion Resistance:

The abrasion resistance of the particular sample specimen was determined in accordance with EN 13892 Part 5 ("Determination of Wear Resistance to Rolling Wheel of Screed Material for Wearing Layer"). 10 000 abrasion cycles were run. The results are listed in Table 2.

TABLE 2

Abrasion resistance of sample specimens:

| | Surface of sample specimen treated with: | |
|---|---|---|
| | — | Ex. 2 dispersion | CEx. 3 dispersion |
| abrasion amount (g) | 14.4 | 2.5 | 5.5 |

Table 2 verifies that the procedure of the present invention reduces abrasion.

What is claimed is:

1. An aqueous dispersion or water-redispersible powder of comprising a polymer, said polymer consisting of:
    a) 2-ethylhexyl acrylate,
    b) n-butyl acrylate,
    c) one or more vinylaromatics or $C_1$ to $C_4$ alkyl methacrylates whose homopolymers have a glass transition temperature Tg of ≥50° C.,
    d) optionally one or more ethylenically unsaturated monomers bearing acid groups,
    e) optionally one or more ethylenically unsaturated monomers bearing silane groups, and
    f) optionally one or more further ethylenically unsaturated monomers other than the aforementioned monomers, with the proviso that said monomers f) are selected from the group consisting of n-hexyl acrylate, n-hexyl methacrylate, monomers having hydroxyl or CO groups, N-methylol(meth)acrylamide, N-(alkoxymethyl)(meth)acrylamides, and polyethylenically unsaturated comonomers,
    wherein the polymer consists of 60 to 99 wt % 2-ethylhexyl acrylate a) and 1 to 40 wt % n-butyl acrylate b), each based on the combined weight of ethylhexyl acrylate a) and n-butyl acrylate b),
    the polymer consists of 30 to 60 wt % 2-ethylhexyl acrylate a), based on the total weight of the polymer, and
    the polymer is obtained by free-radically initiated emulsion polymerization in an aqueous medium, the emulsion polymerization optionally being carried out in the presence of regulators, wherein the regulators are selected from the group consisting of n-dodecylmercaptan, tert-dodecylmercaptan, mercaptopropionic acid, mercaptopropionic acid methyl ester, isopropanol, and acetaldehyde.

2. The aqueous dispersion or water-redispersible powder of claim 1, wherein the polymer consists of 70 to 96 wt % 2-ethylhexyl acrylate a), based on the combined weight of ethylhexyl acrylate a) and n-butyl acrylate b).

3. The aqueous dispersion or water-redispersible powder of claim 1, wherein the polymer consists of 30 to 50 wt % 2-ethylhexyl acrylate a), based on the total weight of polymer.

4. The aqueous dispersion or water-redispersible powder of claim 1, wherein the polymer consists of 1 to 20 wt % n-butyl acrylate b), based on the total weight of the polymer.

5. The aqueous dispersion or water-redispersible powder of claim 1, wherein one or more monomers c) are selected from the group comprising styrene, alpha-methylstyrene, methyl methacrylate, tert-butyl methacrylate, tert-butyl acrylate, lauryl acrylate, and stearyl acrylate.

6. The aqueous dispersion or water-redispersible powder of claim 1, wherein one or more monomers d) bear a sulfonic acid group and/or a carboxylic acid group.

7. The aqueous dispersion or water-redispersible powder of claim 1, wherein one or more ethylenically unsaturated monomers e), bearing silane groups, are compounds of the general formula $R^1SiR^2{}_{0-2}(OR^3)_{1-3}$, where $R^1$ represents $CH_2\!=\!CR^4\!-\!(CH_2)_{0-1}$ or $CH_2\!=\!CR^4CO_2(CH_2)_{1-3}$ where carbon moiety $R^4$ has from 1 to 10 carbon atoms, $R^2$ represents a $C_1$ to $C_3$ alkyl moiety, $C_1$ to $C_3$ alkoxy moiety, or halogen, and $R^3$ represents a branched or unbranched, optionally substituted alkyl moiety of 1 to 12 carbon atoms.

8. An aqueous coating medium comprising one or more polymers according to claim 1, water, and optionally one or more additives.

9. An aqueous dispersion as claimed in claim 1, wherein the aqueous dispersion does not contain any protective colloids.

10. A dirt-repellent coating comprising a polymer according to claim 1.

11. The aqueous coating medium as claimed in claim 8, wherein the aqueous coating medium does not contain any protective colloids.

12. A method of producing a dirt-repellent coating on a substrate, comprising applying to the substrate a polymer according to claim 1.

* * * * *